US012791878B2

(12) United States Patent
Mamchik

(10) Patent No.: US 12,791,878 B2
(45) Date of Patent: Nov. 10, 2026

(54) DYNAMIC EXTRAOCULAR FILTERING FOR CORRECTION OF COLOR CONTRAST PERCEPTION

(71) Applicant: Vladimir Mamchik, Hillsboro, OR (US)

(72) Inventor: Vladimir Mamchik, Hillsboro, OR (US)

(73) Assignee: Vladimir Mamchik, Hillsboro, OR (US)

( * ) Notice: Subject to any disclaimer, the term of this patent is extended or adjusted under 35 U.S.C. 154(b) by 0 days.

(21) Appl. No.: 18/596,596

(22) Filed: Mar. 5, 2024

(65) Prior Publication Data

US 2025/0284142 A1 Sep. 11, 2025

(51) Int. Cl.

*G02C 7/10* (2006.01)
*G02B 5/20* (2006.01)
*G02F 1/13* (2006.01)

(52) U.S. Cl.

CPC ............... *G02C 7/104* (2013.01); *G02B 5/20* (2013.01); *G02F 1/13* (2013.01)

(58) Field of Classification Search

CPC .............. G02C 7/104; G02B 5/20; G02F 1/13
See application file for complete search history.

(56) References Cited

U.S. PATENT DOCUMENTS 4,966,441 A * 10/1990 Conner ................... G06F 1/203 349/97
6,920,000 B2 * 7/2005 Steinfield .......... G02F 1/133514 359/885
2007/0091113 A1 * 4/2007 Jones ..................... G09B 29/02 345/592
2011/0128309 A1 * 6/2011 Miyazaki ............. G09G 3/3607 345/690
2014/0233105 A1 * 8/2014 Schmeder .............. G02B 5/201 359/590
2016/0077361 A1 * 3/2016 Wold ..................... G02C 7/104 351/44
2019/0219834 A1 * 7/2019 Ace ........................ G02B 5/223
2020/0383563 A1 * 12/2020 Allard .................... A61B 3/066

OTHER PUBLICATIONS

Mamchik, V. Dynamic Extraocular Filtering A Novel Method for Active Correction of Color Vision Deficiency. Opt Vis Sci, 2022;99: E-Abstract 220015.
Brown, A.M., et al. Human Flicker Fusion Correlates With Physiological Measures of Temporal Processing. Frontiers in Human Neuroscience. 2018;12:176.
Petrova, D., Henning, G.B., Stockman, A. The temporal characteristics of the early and late stages of the L- and M-cone chromatic pathway. Journal of Vision. 2013;13(9):15.

* cited by examiner

*Primary Examiner* — Charles S Chang

(57) ABSTRACT

Dynamic extraocular filtering is a correction method to improve color contrast recognition in color vision deficient observers (non-normal color vision). This method is based on actively controlling wavelength spectrum transmission to retinal photoreceptors, introducing a temporal contrast that is interpreted as color contrast by the observer. The method functions by utilizing an active filter that produces several filter conditions which change at a high frequency. This method changes filter conditions dynamically as opposed to current systems which rely on static band-stop filters.

13 Claims, 6 Drawing Sheets

DYNAMIC EXTRAOCULAR FILTERING FOR CORRECTION OF COLOR CONTRAST PERCEPTION

FIELD

This invention is in the field of vision correction and optometry.

BACKGROUND

Current methods to correct color contrast perception in individuals with color vision deficiency can restrict more colors from being seen and not correct color vision as needed. There is an unmet need for a method that can provide correction to color contrast perception in color vision deficient individuals that improves color contrast perception while maintaining integrity of normal vision.

OBJECTS OF THE INVENTION

It is the object of the invention to provide increased color contrast perception to observers with color vision deficiency by extraocular means.

SUMMARY

Dynamic extraocular filtering as a method to correct color contrast perception involves a new approach to improve the ability to differentiate between chromatic hues in observers with color vision deficiency (or "colorblindness").

This method involves dynamically changing the wavelength composition of perceived light through an active filter. The changing of filter conditions occurs at a high enough frequency that there is no perceivable chromatic difference in the filter conditions (seen as if a white filter) but the improvement to contrast perception remains.

In each filter condition, by selectively removing wavelengths of incoming spectra, a brightness difference is introduced between previously indistinguishable colors. Additionally, a full spectrum filter condition is used to include the full wavelength spectrum.

With these filter conditions being changed at high frequencies, the improved contrast is seen for all previously confusing colors along with the full spectrum of wavelengths, meaning no colors are restricted from being seen.

DETAILED DESCRIPTION OF THE DRAWINGS

Figure 1:
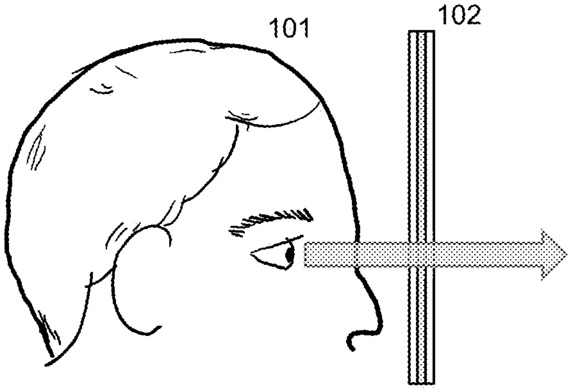
FIG. 1: An image depicting how dynamic extraocular filtering is used with human observers, held in front of the field of view as a visual assistive device. The observer looks through the active filter to perceive their surroundings.

As seen in FIG. 1, the method of dynamic extraocular filtering is applied outside of the eyes, with the observer (101) using the active filter (102) in front of their field of view. This affects the perception of the observer, allowing the effect of dynamic extraocular filtering to improve color contrast perception.

Figure 2:
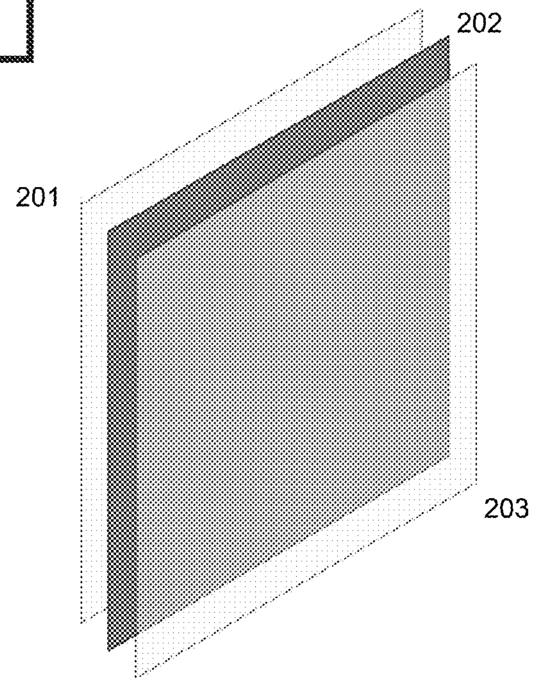
FIG. 2: The basic construction of an active filter, including a front and back glass sheet as well as an inner liquid crystal layer to change wavelength transmissibility of filter.

The construction of this active filter is further elaborated on in FIG. 2. The method of dynamic extraocular filtering works by using an active filter, or a filter which can quickly change wavelength transmissibility depending on a program. In FIG. 2, an example of an active filter is shown, composing of two layers of glass (201, 203) and a liquid crystal matrix in between (202).

This specific construction is simply one embodiment of an active filter which can be used in the application of dynamic extraocular filtering. The liquid crystal matrix can be programmed externally, changing the wavelength transmissibility through the filter depending on the color desired.

Figure 3:
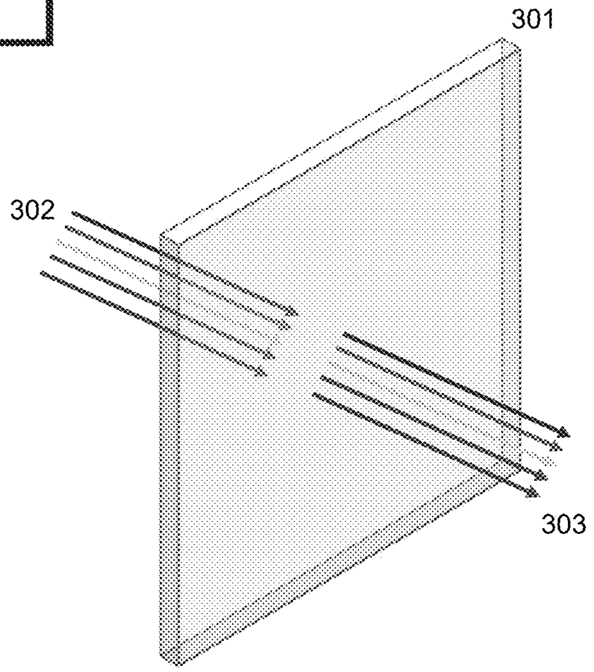
FIG. 3: An illustration of the full spectrum filtering condition, showing no change in the wavelengths that go through the active filter.

In FIG. 3, the full spectrum filter condition is shown, illustrating how the incoming light containing all wavelengths (302) goes through the active filter (301) and is outputted with no difference in wavelength composition (303). This condition is equivalent to a white filter, where no colors are being removed from the spectrum.

Figure 4:
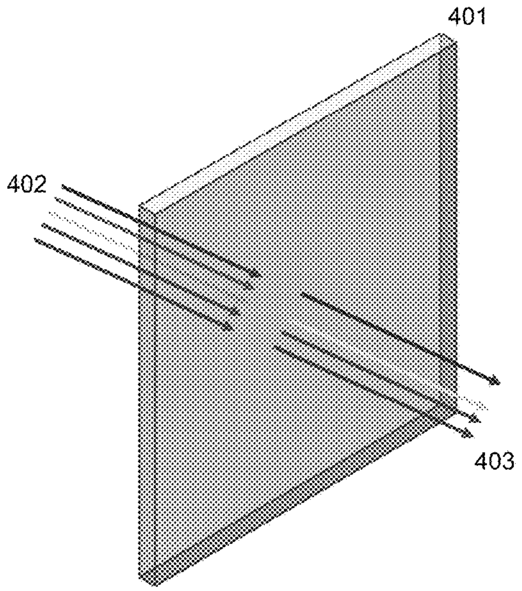
FIG. 4: The magenta and cyan filter conditions (e.g. red and green-wavelength filtering), showing how the wavelengths that are perceived through the filter are different depending on the filter condition

In FIG. 4, the magenta and cyan filter conditions are shown. The magenta filter (401) is set to selectively filter out green portions of the incoming spectrum (402), changing the wavelength composition of incoming light (403). Similarly, the cyan filter (404) is programmed to specifically remove red wavelengths from the incoming light (405), leading to a modified spectrum being perceived through the filter (406).

Figure 5:
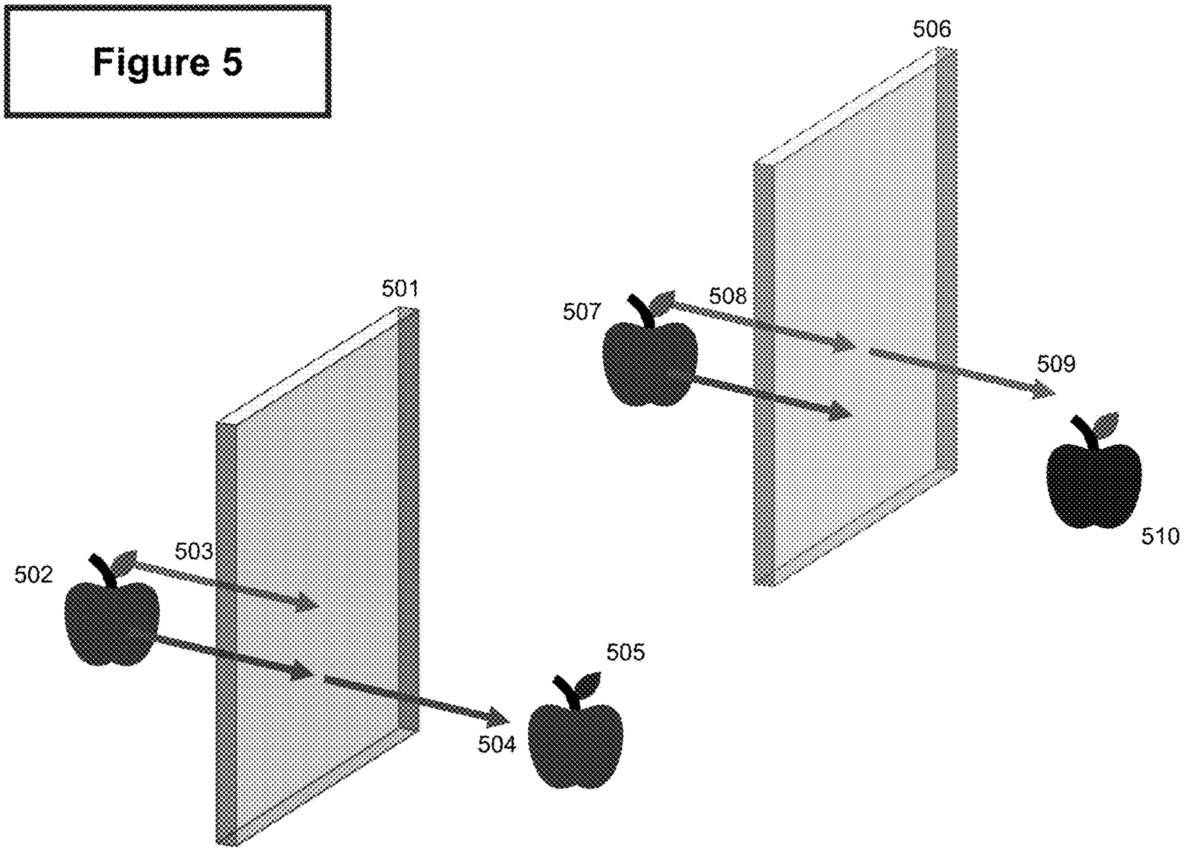
FIG. 5: An illustration of the use of dynamic extraocular filtering, showing both the magenta and cyan filter conditions. When an apple of colors green and red are perceived through the active filter, colors of wavelengths filtered out are perceived with increased brightness contrast.
Figure 6:
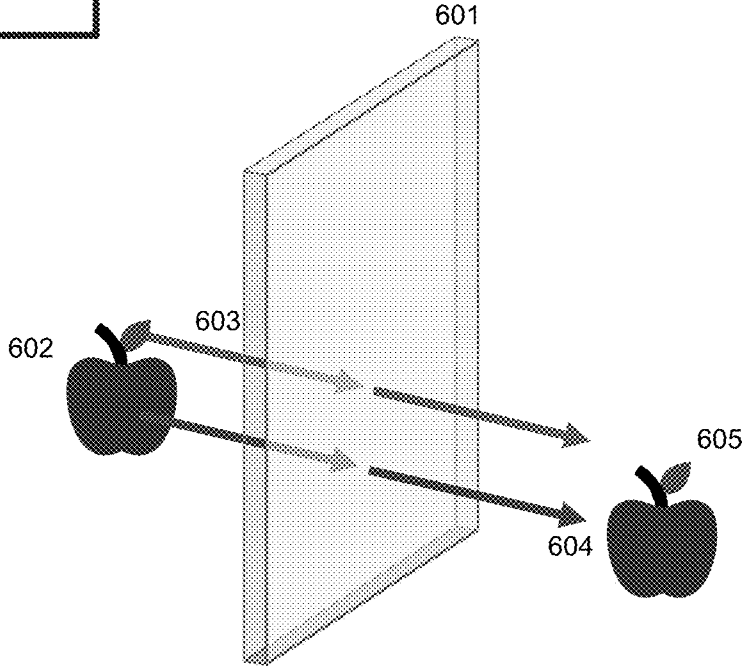
FIG. 6: Depiction of the same apple of colors green and red perceived with a full spectrum filter condition, showing no change in color contrast (i.e., full spectrum is being seen).

The effect of these filtering conditions is shown in FIGS. 5 and 6. In FIG. 5, the effect of the cyan and magenta filters are shown being applied to green and red apples. The magenta filter (501) is placed in front of the object (502), which is perceived to normally have green and red color (503). However, when perceived through the filter, the green wavelengths are filtered out (504), leading to a darker hue to previously green colors (505). This is similar to the cyan filter condition, where the cyan filter (506) is placed in front of the colored object (507) which is perceived and green and red (508). However, the properties of the cyan filter remove red wavelengths (509), meaning the red color of the object is seen as darker (510).

FIG. 6 shows the application of a full spectrum filter condition on the colored object, having the full spectrum filter (601) applied to the colored object (602) perceived as green and red (603). The application of the filter has no effect on the wavelengths (604), meaning the object is perceived with no differences (605).

What is claimed is:

1. A method of enhancing chromatic contrast perception in a color-deficient subject, comprising temporally modulating transmission of at least one chromatic spectral band associated with an opponent pathway at a modulation frequency greater than the subject's chromatic critical flicker-fusion frequency (CCFF) so that flicker is not consciously perceived.

2. The method of claim 1, wherein two spectral bands are modulated in anti-phase.

3. The method of claim 1, wherein the spectral band targets an L-M opponent channel or an S-cone opponent pathway.

4. The filter conditions as mentioned in claim 1 also include a "Full Spectrum" condition, which does not remove any wavelengths from incoming spectra.

5. The method of claim 1, wherein the modulation frequency is at least equal or above the CCFF.

6. The method of claim 1, wherein the modulation is implemented by a liquid crystal device, a mechanically interchangeable filter, or another analog or digital optical filtering technique.

7. The method of claim 1, further comprising a full-spectrum condition in which no wavelengths are attenuated.

8. A system for assisting a color-deficient subject, comprising: a chromatic band-selective modulator; and a controller configured to drive the modulator to alternate subtraction and/or addition of at least one spectral band at a modulation frequency greater than or equal to the subject's CCFF so that flicker is not consciously perceived.

9. The system of claim 8, wherein the controller is configured to vary at least one of modulation frequency, duty cycle, and phase.

10. The system of claim 8, wherein two spectral bands are modulated in anti-phase with a duty cycle between 30% and 70%.

11. The system of claim 8, wherein the spectral band targets an L-M opponent channel or an S-cone opponent pathway.

12. The system of claim 8, wherein the modulator comprises a liquid crystal device, a mechanically interchangeable filter, or another analog or digital optical filtering technique.

13. The system of claim 8, wherein the controller is integrated into eyewear, a window or windshield, a display, or a hand-held assistive device.

* * * * *